United States Patent Office 2,921,076
Patented Jan. 12, 1960

2,921,076
HETEROCYCLIC COMPOUNDS AND METHODS FOR PRODUCING THE SAME

Robert F. Parcell, St. Clair Shores, Mich., assignor to Parke, Davis & Company, Detroit, Mich., a corporation of Michigan No Drawing. Application January 22, 1958
Serial No. 710,387

12 Claims. (Cl. 260—293.4)

This application is a continuation-in-part of my co-pending application Serial Number 684,847, filed September 19, 1957, and the application relates to certain heterocyclic compounds and to methods for producing the same. More particularly, the invention relates to five membered ring heterocyclic compounds having a basic substituent in the 2-position and to acid addition salts thereof. The compounds of the invention in the free base form have the formula,

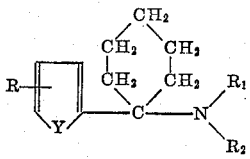

where R is hydrogen or a methyl group, Y is —O— or —S—; $R_1$ and $R_2$ are the same or different and represent hydrogen or lower alkyl radicals or together with —N< a pyrrolidino, piperidino, lower alkyl substituted pyrrolidino or lower alkyl substituted piperidino radical.

In accordance with the invention heterocyclic compounds of the above formula and salts thereof may be produced in a number of different ways.

The compounds wherein $R_1$ and $R_2$ are lower alkyl radicals or joined together with —N< to form a heterocyclic amino group can be prepared by reacting a magnesium halide compound of formula,

with a 1-cyanocyclohexyl amine compound of formula,

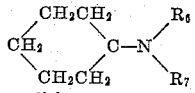

under anhydrous conditions and decomposing the resulting product with water, where R and Y have the same significance as given above, $R_6$ and $R_7$ represent lower alkyl radicals or together with —N< a pyrrolidino, piperidine, lower alkyl substituted pyrrolidino or lower alkyl substituted pyrrolidino radical and X is halogen. The initial phase of the reaction is carried out in a non-hydroxylic organic solvent such as an ether or a hydrocarbon like benzene, toluene, xylene or petroleum ether and at a temperature between about 0 and 100° C. The relative quantities of the two reactants is not critical but it is preferable to use either approximately equivalent amounts or a slight (10 to 20%) excess of the magnesium halide compound. However, in the case where $R_1$ and/or $R_2$ is hydrogen, one extra equivalent of the magnesium halide compound must be used for each hydrogen present in the amine group. The decomposition phase of the reaction can be carried out using water alone, aqueous acid, aqueous ammonium chloride, ammonium hydroxide and the like.

The heterocyclic compounds having a secondary amino group in the 2-substituent group are preferably prepared by reacting an alkali metal compound of formula,

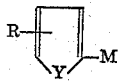

with an N-cyclohexylidene amine of formula,

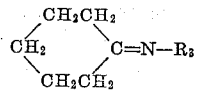

under anhydrous conditions and decomposing the resulting product with water, where Y and R have the same significance as mentioned above, $R_3$ is a lower alkyl radical and M is an alkali metal preferably lithium. The initial phase of the reaction is carried out under anhydrous conditions in a non-hydroxylic organic solvent such as an ether or a hydrocarbon like benzene, toluene, xylene and petroleum ether. The temperature may be varied between about 0 and 100° C. The relative quantities of the two reactants is not particularly critical but in most instances it is preferable to use approximately equivalent amounts.

The heterocyclic compounds having a secondary amino group in the 2-substituent group can also be prepared by reacting an alkali metal compound of formula,

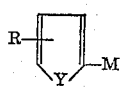

with an α-alkylaminocyclohexane carbonitrile of formula,

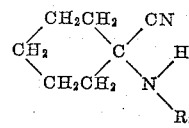

under anhydrous conditions and decomposing the resulting products with water, where R, Y and M have the same significance as given above and $R_3$ is a lower alkyl group. The initial phase of the reaction is carried out in a non-hydroxylic organic solvent such as diethyl ether, dipropyl ether, tetrahydrofuran and 1,2-diethoxyethane at a temperature between 10 and 100° C. The relative quantities of the two reactants is not critical but at least two equivalents of the alkali metal compound should be used for each equivalent of the α-alkylaminocyclohexane carbonitrile due to the inter-action of one equivalent of the alkali metal compounds with the active hydrogen of the carbonitrile reactant.

The products containing a tertiary amino group, that is where $R_1$ and $R_2$ are lower alkyl radicals or together with —N< form a pyrrolidino, piperidino, lower alkyl substituted pyrrolidino or lower alkyl substituted piperidino radical, can be prepared by reacting a carboxamide compound of formula,

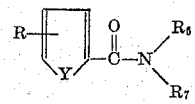

with a pentamethylene bis-magnesium halide of formula, $$X-Mg-(CH_2)_5-MgX$$

under anhydrous conditions and decomposing the reaction product with water, where R and Y have the same significance as given above, $R_6$ and $R_7$ have the limited meaning set forth in this paragraph for $R_1$ and $R_2$ and X is a halogen atom. The initial phase of the reaction is carried out in an inert organic solvent such as diethylether, tetrahydrofuran, dipropyl ether or 1,2-diethoxyethane. The reaction can be carried out at a temperature from 35 to about 100° C. As the reaction proceeds, the temperature can be raised, if desired, to between 70 and 120° C. In carrying out the process equimolar quantities of the two reactants can be used or, if desired, an excess of the organo-metallic pentamethylene derivative can be employed. The decomposition phase of the reaction can be carried out using water alone, aqueous acid, aqueous ammonium hydroxide or the like.

The heterocyclic compounds containing a tertiary amino group wherein the $R_1$ and $R_2$ groups are lower alkyl radicals can also be prepared by alkylation of the corresponding primary and secondary amino compounds of formula,

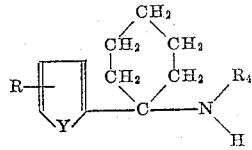

where R and Y have the same significance as given above and $R_4$ is hydrogen or a lower alkyl group. Such alkylations can be carried out using the methods normally employed for the alkylation of primary and secondary amines such as, for example, reaction with an alkyl halide, dialkyl sulfate or a mixture of formaldehyde and formic acid.

2-[-(1-amino)cyclohexyl]thiophene and R substituted derivatives thereof can be produced by converting the carboxylate function present in a 2-[1-cyclohexyl]thiophene compound of formula,

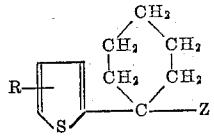

to a primary amino group, where R has the same significance as given above and Z is a carboxylate function such as a primary amide, carboxyl, carboxylate ester or nitrile group. In the case where Z is a primary amide group this can be accomplished by treatment of the 2-[1-(1-carboxamido)cyclohexyl]thiophene with an alkali metal hypohalite followed by hydrolysis of the resultant isocyanate with a strong aqueous solution of a mineral acid. Where Z is a carboxyl group, the 2-[1-(1-carboxy)-cyclohexyl]thiophene in a strong mineral acid is treated with hydrazoic acid. Where Z is a carboxylate ester group, the hydrazide is prepared by the action of hydrazine on the ester, the hydrazide is treated with nitrous acid to produce the azide, the azide treated with a lower aliphatic alcohol to produce the carbamic acid alkyl ester and the latter product treated with a strong mineral acid. The azide can also be prepared from 2-[1-(1-carboxy)cyclohexyl]thiophene by the action of thionyl chloride followed by reaction of the acid chloride with an alkali metal azide. The azide obtained by this method can be converted to the amine in the previously described manner. Where Z is a nitrile group, the 2-[1-(1-cyano)cyclohexyl]thiophene can be treated with hydroxylamine to obtain the amido oxime, the amido oxime treated with benzenesulfonyl chloride to produce the urea compound which can then be hydrolyzed with strong alkali. Alternatively, the nitrile can be hydrolyzed to the amide which is treated as described above.

The free base compounds having the first formula given above are converted to their acid addition salts by reaction with the corresponding inorganic or organic acid. Some examples of the salts which can be prepared in this manner are the mineral acid salts such as the hydrochloride, hydrobromide, sulfate and phosphate; organic acid salts such as succinate, benzoate, acetate and p-toluene sulfonate; and salts with other strong acids such as the sulfamate.

The products of the invention upon either oral or parenteral administration to animals and humans produce a depressant-like effect upon the central nervous system. They are useful in both veterinary and human medicine as adjuncts in anesthesia, particularly in barbiturate anesthesia, because they permit the use of much smaller quantities of the anesthetic agent thus eliminating or minimizing the undesirable side effects so often encountered when the anesthetic agent is used alone in the customary manner. For example, in canine surgery an intravenous dose of 20 mg./kg. of 5-allyl-5-(1-methylbutyl)-2-thiobarbituric acid is required to produce a surgical anesthesia which will last for at least thirty minutes while a 10 mg./kg. intravenous dose ordinarily produces no evidence whatsoever of anesthesia. However, a surgical anesthesia lasting at least thirty minutes can be produced by the intravenous administration of 10 mg./kg. of 5-allyl-5-(1-methylbutyl)-2-thiobarbituric acid if one first administers from 3 to 10 mg./kg. of the products of the invention by the intramuscular route and about fifteen minutes later administers the 10 mg./kg. of the 5-allyl-5-(1-methylbutyl)-2-thiobarbituric acid. Thus the products of the invention permit the use of from one-half to one-third the usual dosage of 5-allyl-5-(1-methylbutyl)-2-thiobarbituric acid and eliminate to a large extent the respiratory depression often associated with the normal use of this anesthetic agent. In humans, oral dosages of between 5 and 50 mg. can be employed for enhancement of the effect of anesthetic agents. The products of the invention are also useful in the treatment of hyper-excitability in both animals and humans. For therapeutic purposes, the acid addition salts are preferred. They may be administered in any of the usual pharmaceutical forms, that is, in tablets, dragees, capsules, syrups and parenteral solutions.

The invention is illustrated by the following examples.

*Example 1*

100 g. of 1-cyanocyclohexyl dimethylamine in 300 ml. of ether is added slowly with stirring to a solution of 2-thienyl magnesium bromide (prepared from 163 g. of 2-bromothiophene and 24 g. of magnesium in 500 ml. of ether) and the mixture stirred with refluxing for three hours. After standing for about sixteen hours sufficient saturated aqueous ammonium chloride solution and concentrated ammonium hydroxide is added to dissolve the inorganic material. The aqueous layer is discarded and the organic layer extracted with several volumes of dilute hydrochloric acid. The acidic aqueous extracts are combined, the solution made alkaline with sodium hydroxide solution and extracted with ether. The ether extracts are dried, the ether distilled and the residue subjected to distillation in vacuo to obtain the desired 2-[1-(1-dimethylamino)cyclohexyl]thiophene boiling at 100° C./1 mm.

The hydrochloride salt is prepared by dissolving the above product in an excess of methanolic hydrogen chloride and precipitating with ether. Recrystallization of the precipitated product from methanol-ether mixture yields the desired 2-[1-(1-dimethylamino)cyclohexyl]thiophene hydrochloride in pure form; M.P. 172–3° C.

*Example 2*

139 g. of 1-cyanocyclohexyl diethylamine in 300 ml. of ether is added slowly with stirring to a solution of 2-thienyl magnesium bromide (prepared from 24 g. of magnesium and 163 g. of 2-bromo-thiophene in 1 liter of ether) and the mixture heated under reflux for four hours. After standing for about sixteen hours, sufficient saturated aqueous ammonium chloride solution and concentrated ammonium hydroxide is added to dissolve the inorganic material. The aqueous layer is discarded and the organic layer washed with three 200 ml. portions of water. After drying over sodium hydroxide, the ether is distilled from the organic layer and the residue distilled in vacuo to obtain the desired 2-[1-(1-diethylamino)-cyclohexyl]thiophene as a colorless oil boiling at 89–91° C./0.2 mm.

The hydrobromide salt can be prepared by dissolving the free base in an excess of isopropanol hydrogen bromide, precipitating the product with ether and recrystallizing from methanol-ether mixture.

The hydrochloride salt can be prepared in the same way as the hydrobromide salt. After recrystallization from acetone-ether mixture the hydrochloride salt melts with decomposition at 127-8° C.

Example 3

77 g. of N-1-cyanocyclohexyl piperidine in 500 ml. of ether is added slowly with stirring to a solution of 2-thienyl magnesium bromide (prepared from 163 g. of 2-bromothiophene and 24 g. of magnesium in 1 liter of ether) and the resulting mixture stirred and refluxed for a period of four hours. After standing for about forty-eight hours the mixture is treated with sufficient saturated aqueous ammonium chloride and ammonium hydroxide to dissolve the inorganic salts. The aqueous layer is discarded and the ether layer extracted several times with equal volume portions of dilute hydrochloric acid each containing 100 ml. of concentrated hydrochloric acid. The combined acidic aqueous extracts are washed with ether, the ether discarded and the aqueous solution made alkaline. The alkaline solution is extracted with ether, the ether extract dried and the ether distilled. Distillation of the residue in vacuo yields the desired 2-[1-(1-piperidino)-cyclohexyl]thiophene as a colorless oil boiling at 110-111° C./0.2 mm.

By using an equivalent amount of N-1-cyanocyclohexyl β-methylpiperidine instead of the N-1-cyanocyclohexyl piperidine in the above procedure, one obtains 2-[1-(1-β-methylpiperidino)cyclohexyl]thiophene. In a similar manner by using N-1-cyanocyclohexyl pyrrolidine one obtains 2-[1-(1-pyrrolidino)cyclohexyl]thiophene.

The hydrochloride salts of the aforementioned substances can be prepared by dissolving the free base in an excess of isopropanolic hydrogen chloride, precipitating the salt with ether and recrystallizing the product thus obtained from acetone-ether mixture. The hydrochloride salt of 2-[1-(1-piperidino)cyclohexyl]-thiophene prepared in this manner melts with a transition point at 182-3° C. and a final melting point of 233-6° C.

The sulfate salt of 2[-1-(1-piperdino)cyclohexyl]thiophene can be prepared by dissolving the free base in exactly one equivalent of ethanolic sulfuric acid followed by precipitation of the salt with ether. The crude salt is collected and purified by recrystallization from methanol-ether mixture.

The tartrate, acetate and sulfamate salts can be prepared by adding an isopropanol solution of 2-[1-(1-piperidino)-cyclohexyl]thiophene to an excess of the acid in isopropanol, precipitating the salt with ether and recrystallizing the product from methanol-ether mixture.

Example 4

108 g. of 3-methyl thiophene in 200 ml. of ether is added slowly with stirring to a solution of butyl lithium (prepared from 16 g. of lithium and 151 g. of butyl bromide in 500 ml. of ether). After about one hour a solution prepared by reacting 26 g. of magnesium with 207 g. of ethylene bromide in 400 ml. of ether is added to the reaction mixture over a period of thirty minutes. 116 g. of N-(1-cyanocyclohexyl)piperidine in 500 ml. of ether is added to the reaction mixture with stirring and the mixture heated under reflux for two hours. After standing for forty-eight hours at room temperature, 295 ml. of a saturated aqueous solution of ammonium chloride is added dropwise and after the addition has been completed, the ether layer is removed. The ether solution is extracted with 600 ml. of 1 N hydrochloric acid and the aqueous extract made alkaline with sodium hydroxide solution. The basic aqueous solution is extracted several times with an equal volume of ether, the ether extracts dried and the ether distilled. Distillation of the residue in vacuo yields the desired 2-[1-(1-piperdino)cyclohexyl]-4-methyl thiophene; B.P. 117-9° C./0.2 mm.; melting point upon solidification 44-50° C.

The hydrochloride salt of 2-[1-(1-piperidino)-cyclohexyl]-4-methyl thiophene can be prepared by dissolving the free base in an excess of isopropanolic hydrogen chloride and precipitating with ether. After recrystallization the salt melts with a transition point at 186-187° C. and a final melting point of 237-9° C.

By substituting an equivalent amount of N-(1-cyanocyclohexyl)-β-methyl pyrrolidine for the N-(1-cyanocyclohexyl)piperidine in the above procedure, one obtains 2-[1-(1-β-methyl-pyrrolidino)-cyclohexyl]-4-methyl thiophene and its hydrochloride salt.

Likewise by substituting an equal amount of 2-methyl thiophene for the 3-methyl thiophene used in the above procedure, one obtains 2-[1-(1-piperidino)-cyclohexyl]-5-methyl thiophene (B.P. 118-9° C./0.2 mm.) and its hydrochloride salt melting with a transition point at 177-8° C. and a final melting point of 237-40° C.

Example 5

A solution of butyl lithium (prepared from 18.5 g. of lithium and 171 g. of butyl bromide in 600 ml. of ether) is added dropwise to 113.5 g. of thiophene in 500 ml. of ether and the mixture stirred for one hour. 85 g. of N-cyclohexylidene isopropylamine is added and the mixture stirred and refluxed for three hours. After standing for sixteen hours, 500 ml. of water is added and the organic layer collected. The organic layer is washed with water, dried and the ether distilled. Distillation of the residue in vacuo yields the desired 2-[1-(1-isopropylamino)cyclohexyl]thiophene; B.P. 86-7° C./0.45 mm.

The hydrochloride salt of 2-[1-(1-isopropylamino)-cyclohexyl]thiophene is prepared by treating the free base with an excess of isopropanolic hydrogen chloride and recrystallizing from isopropanol-ether mixture; M.P. 187-8° C.

Example 6

A solution of phenyl lithium (prepared by reacting 15 g. of lithium with 157 g. of bromobenzene in 1 liter of ether) is added with stirring to 84 g. of thiophene in 400 ml. of ether and the mixture stirred and refluxed for three hours. 85 g. of N-cyclohexylidene ethylamine is added and the mixture stirred and refluxed for eighteen hours. 500 ml. of water is added and the organic layer separated. The organic layer is washed with water and then extracted with 85 ml. of concentrated hydrochloric acid in 500 ml. of water. The acidic aqueous extract is made alkaline with sodium hydroxide and extracted with ether. The ether extracts are combined, dried and the ether distilled. Distillation of the residue in vacuo yields the desired 2-[1-(1-ethylamino)cyclohexyl]thiophene; B.P. 87-8° C./0.4 mm.

The hydrochloride salt of 2-[1-(1-ethylamino)-cyclohexyl]thiophene is prepared by dissolving the free base in an excess of isopropanolic hydrogen chloride and precipitating with ether. After recrystallization from isopropanol-ether mixture the product melts at 195-196° C.

Example 7

A mixture consisting of 21 g. of 2-[1-(1-ethylamino)-cyclohexyl]thiophene, 10 ml. of 37% aqueous formaldehyde and 25 ml. of formic acid is heated on a steam bath until the evolution of carbon dioxide ceases. The mixture is heated for an additional hour, cooled and treated with an excess of strong sodium hydroxide solution. The mixture is extracted with ether, the ether extract dried and the ether distilled. The crude 2-[1-(1-ethylmethylamino)-cyclohexyl]thiophene thus obtained can be converted to the hydrochloride salt by treatment with an excess of isopropanolic hydrogen chloride followed by precipitation with ether. Alternatively, the free base can be distilled in vacuo prior to treatment with isopropanolic hydrogen chloride. Recrystallization of the crude salt from methanol-ether mixture yields the pure 2-[1-(1-ethylmethylamino)cyclohexyl]thiophene hydrochloride.

Example 8

A mixture consisting of 42 g. of 2-[1-(1-ethylamino)

cyclohexyl]thiophene, 16 g. of diethyl sulfate and 200 ml. of toluene is stirred and refluxed for sixteen hours. The mixture is diluted with five volumes of ether, the insoluble material removed by filtration and the ether evaporated from the filtrate. The residue is distilled under reduced pressure to obtain the desired 2-[1-(1-diethylamino)cyclohexyl]thiophene; B.P. 89–91° C./0.2 mm.

The p-toluenesulfonate salt can be prepared by adding an isopropanol solution of the above free base to an excess of p-toluene sulfonic acid dissolved in isopropanol and precipitating the salt with ether. The crude product is purified by recrystallization from methanol-ether mixture.

Example 9

68 g. of furan is added to a solution of butyl lithium prepared from 13.5 g. of lithium and 120 g. of butyl bromide in 700 ml. of ether and then stirred for one hour. An ether solution of the reaction product of 20 g. of magnesium and 150 g. of ethylene bromide is added and the resulting mixture stirred and refluxed for one hour. 135 g. of N-(1-cyanocyclohexyl)piperidine in 400 ml. of ether is added and the mixture heated under reflux for six hours. Sufficient saturated aqueous ammonium chloride solution is added to dissolve the inorganic salts, the ether layer separated and the ether removed by distillation. Distillation of the residue in vacuo yields the desired 2-[1-(1-piperidino)cyclohexyl]furan; B.P. 89–90° C./0.3 mm.

The hydrochloride salt of 2-[1-(1-piperidino)cyclohexyl]furan is prepared by dissolving the free base in ether and treating the solution with an excess of hydrogen chloride. Recrystallization of the precipitated product from ethyl acetate-ether mixture yields the pure salt; M.P. 187–8° C. Upon standing the melting point falls to 167–8° C. with no apparent change in analysis or infrared spectrum.

By substituting an equivalent amount of 2-methylfuran for the furan used in the above procedure, one obtains 2-[1-(1-piperidino)cyclohexyl]-5-methyl furan (B.P. 93–5° C./0.15 mm.) and its hydrochloride salt which melts with a transition point at 165–6° C. and a final melting point with decomposition into two phases at 238–241° C.

Example 10

95 g. of furan is added to a solution of butyl lithium prepared from 10 g. of lithium and 151 g. of butylbromide in 500 ml. of ether and the mixture stirred and refluxed for two hours. A solution prepared by reacting 26 g. of magnesium with 207 g. of ethylene bromide in 400 ml. of ether is added to the reaction mixture and then, after stirring for forty-five minutes, 106 g. of 1-cyanocyclohexyl dimethylamine is added. The reaction mixture is allowed to stand for eighteen hours and then sufficient concentrated ammonium hydroxide and saturated aqueous ammonium chloride solution added to dissolve the inorganic salts. The organic layer is separated, dried and the ether distilled. Distillation of the residue in vacuo yields the desired 2-[1-(1-dimethylamino)cyclohexyl]furan; B.P. 60–2° C./ 0.35 mm.

The hydrochloride salt of 2-[1-(1-dimethylamino)cyclohexyl]furan is prepared by treatment of the free base with an excess of isopropanolic hydrogen chloride followed by precipitation with ether. After recrystallization the salt melts at 167–8° C.

By substituting 90 g. of 2-methylfuran for the furan used in the above procedure one obtains 2-[1-(1-dimethylamino)cyclohexyl]furan (B.P. 74–5° C./0.4 mm.) and its hydrochloride salt (M.P. 172–3° C. with a transition point of 147–8° C.).

Example 11

120 g. of N,N-dimethyl-2-thiophene carboxamide (prepared from 150 g. of 2-thiophene carbonyl chloride and an excess of aqueous dimethylamine) is added to an ether solution of pentamethylene bis-magnesium bromide (prepared from 56 g. of magnesium and 230 g. of pentamethylene dibromide in 2 liters of dry ether) and the ether removed by distillation until the temperature of the mixture reaches 75° C. The reaction mixture is stirred at this temperature for 16 hours, cooled and then treated with sufficient ammonium hydroxide and saturated ammonium chloride to dissolve the solids. The mixture is diluted with two liters of ether and the organic layer removed. The organic layer is washed with water, dried and the ether distilled. Distillation of the residue in vacuo yields the desired 2-[1-1-dimethylamino)-cyclohexyl]thiophene; B.P. 100° C. at 1 mm.

The hydrochloride salt is prepared by dissolving the above product in an excess of methanolic hydrogen chloride and precipitating with ether. Recrystallization of the precipitated product from methanol-ether mixture yields the desired 2-[1-(1-dimethylamino)cyclohexyl]thiophene hydrochloride in pure form; M.P. 172–3° C.

Example 12

109 g. of thiophene in 500 ml. of ether is added with stirring to a refluxing solution of phenyl lithium prepared from 204 g. of bromobenzene and 19 g. of lithium in 1 l. of ether. 76 g. of α-ethylaminocyclohexane carbonitrile is added to the 2-thienyl lithium solution and the mixture stirred and refluxed for four hours. The mixture is allowed to stand at room temperature for 18 hours and then it is treated with 500 ml. of water. The ether layer is removed, dried and the ether distilled. Distillation of the residue in vacuo yields the desired 2-[1-(1-ethylamino)cyclohexyl]thiophene; B.P. 97–100° C. at 1 mm.

The hydrochloride salt of 2-[1-(1-ethylamino)cyclohexyl]thiophene is prepared by dissolving the free base in an excess of isopropanolic hydrogen chloride and precipitating with ether. After recrystallization from isopropanol-ether mixture the product melts at 195–6° C.

Example 13

125 g. of bromine is added rapidly to a solution of 400 g. of potassium hydroxide in 2 liters of water at 5–10° C. 137 g. of 1-(2-thienyl)cyclohexane carboxamide is added to the cold solution and the mixture stirred at 5° C. for one hour. The reaction mixture is allowed to warm to 25° C. over a period of three hours and then it is acidified by the addition of 560 ml. of concentrated hydrochloric acid. The mixture is filtered and then the filtrate made alkaline with sodium hydroxide solution and extracted with ether. The ether extracts are combined, dried and the ether distilled. Distillation of the residue in vacuo yields the desired 2-[1-(1-amino)-cyclohexyl]thiophene; B. P. 92–3° C. at 1 mm.

The hydrochloride salt of 2-[1-(1-amino)-cyclohexyl]-thiophene can be prepared by dissolving the above free base in an excess of isopropanolic hydrogen chloride followed by precipitation with ether. The salt can be purified by recrystallization from methanol-ether mixture; M.P. 215–16° C.

Example 14

A mixture consisting of 18.1 g. of 2-[1-(1-amino)-cyclohexyl]thiophene, 46 g. of formic acid and 20 ml. of 37% formaldehyde is heated on a steam bath until carbon dioxide ceases to be evolved and then for an additional hour. The reaction mixture is made alkaline with sodium hydroxide solution, the mixture extracted with ether and the ether extract dried. Distillation of the ether followed by distillation of the residue in vacuo yields the desired 2-[1-(1-dimethylamino)cyclohexyl]-thiophene; B.P. 100° C. at 1 mm.

The hydrochloride salt is prepared by dissolving the above product in an excess of methanolic hydrogen chloride and precipitating with ether. Recrystallization of the precipitated product from methanol-ether mixture yields the desired 2-[1-(1-dimethylamino)cyclohexyl]thiophene hydrochloride in pure form; M.P. 172-3° C.

The 1-cyanocyclohexyl amines used as starting materals in the practice of the invention can be prepared by reacting the bisulfite addition compound of cyclohexanone with an alkali metal cyanide and the corresponding amine in aqueous solution. For example, the 1-cyanocyclohexyl dimethylamine used as the starting material in Example 1 can be prepared as follows:

196 g. of cyclohexanone is added with stirring to 200 g. of sodium meta bisulfite in 750 ml. of water and the solution stirred for two hours at 5° C. A solution of 137 g. of potassium cyanide and 350 ml. of 32.5% aqueous dimethylamine is added dropwise to the solution keeping the temperature below 10° C. and then the resulting mixture stirred for two and a half hours at 0-10° C. After standing for about sixteen hours at 0 to 5° C., the precipitated 1-cyanocyclohexyl dimethylamine is collected, washed with water and dried. Recrystallization from ether yields the pure product; M.P. about 30° C. If desired, the product can be purified by distillation in vacuo; B.P. 107-110° C./7-8 mm.

The above procedure is modified slightly when preparing the liquid 1-cyanocyclohexyl amines, such as 1-cyanocyclohexyl diethylamine, by extracting the product from the reaction mixture with ether, drying the extract and subjecting the residue obtained after distillation of the ether to vacuum distillation.

The N-cyclohexylidene amines also used as starting materials in the practice of the invention can be prepared by reacting cyclohexanone with the corresponding monoalkylamine. The following example of the preparation of N-cyclohexylidene ethylamine is representative of the procedure usually employed.

196 g. of cyclohexanone and 100 g. of anhydrous ethylamine cooled to about 5° C. are mixed keeping the temperature at about 0 to 5° C. and the mixture allowed to stand at 0 to 5° C. for sixteen hours. 100 g. of solid potassium hydroxide is added and the mixture shaken thoroughly. The organic layer is separated and then distilled in vacuo to obtain the desired N-cyclohexylidene ethylamine boiling at 64-7° C./20 mm.

The furyl magnesium halide starting materials are best prepared by reacting the furan with butyl lithium to produce the lithium furan and then reacting this product with a magnesium halide etherate prepared by the reaction of magnesium with an ether solution of an ethylene halide.

The 1-thienylcyclohexane carboxamide starting materials can be prepared by reacting the 1-thienylcyclohexane carbonitrile with alkali to obtain the acid, reacting the acid with thionyl chloride to obtain the acid chloride and reacting this substance with ammonia. The following procedure is illustrative:

A mixture of 169 g. of 2-thienylacetonitrile and 322 g. of pentamethylene dibromide is added over a period of 5 hours to a stirred suspension of 250 g. of 50% sodium amide in a xylene dispersion in 6 l. of ether; the heat of reaction maintains a gentle refluxing. The solution is stirred for 17 hours at room temperature and then decomposed cautiously with one l. of water. The ether layer is decanted and concentrated to about two l. This ethereal solution is washed twice with water, twice with dilute hydrochloric acid, again with water, dried over anhydrous magnesium sulfate and evaporated. The residue is distilled in vacuo to give 1-(2-thienyl)-cyclohexane carbonitrile, B.P. 101-102° C./3.5 mm.

A solution of 135 g. of 1-(2-thienyl)cyclohexane carbonitrile and 120 g. of potassium hydroxide in 900 ml. of glycerol is refluxed for 18 hours. About 500 ml. of glycerol is removed by distillation in vacuo and the remaining solution is poured into 3.5 l. of ice water. This mixture is acidified with concentrated hydrochloric acid, chilled and filtered. The filter cake is 1-(2-thienyl)cyclohexane carboxylic acid, M.P. 146-149° C.

A solution of 139 g. of 1-(2-thienyl)cyclohexane carboxylic acid, 90 ml. of thionyl chloride and one ml. of pyridine is heated on a steam bath for two hours. The excess thionyl chloride is removed under reduced pressure. The residual solution is diluted with an equal volume of acetone and added slowly dropwise to a liter of concentrated ammonium hydroxide solution keeping the temperature at 0-3° C. with vigorous stirring. After stirring for 45 minutes the precipitate is removed by filtration and dried. The product is 1-(2-thienyl)cyclohexane carboxamide, M.P. 102.5-105° C.

I claim:

1. A compound of the class consisting of a free base and its acid addition salts, said free base having the formula,

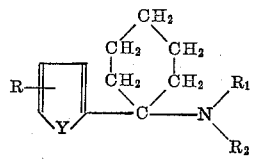

where R is a member of the class consisting of hydrogen and methyl groups, Y is a member of the class consisting of —O— and —S—, $R_1$ and $R_2$ are members of the class consisting of hydrogen and lower alkyl radicals and together with —N< pyrrolidino, piperidino, lower alkyl substituted pyrrolidino and lower alkyl substituted piperidino radicals.

2. An acid addition salt of 2-[1-(1-piperidino)cyclohexyl]thiophene.

3. 2-[1-(1-piperidino)cyclohexyl]thiophene hydrochloride.

4. An acid addition salt of 2-[1-(1-ethylamino)cyclohexyl]thiophene.

5. 2-[1-(1-ethylamino)cyclohexyl]thiophene hydrochloride.

6. An acid addition salt of 2-[1-(1-piperidino)cyclohexyl]-4-methyl thiophene.

7. 2-[1-(1-piperidino)cyclohexyl]-4-methyl thiophene.

8. An acid addition salt of 2-[1-(1-piperidino)cyclohexyl]furan.

9. 2-[1-(1-piperidino)cyclohexyl]furan hydrochloride.

10. An acid addition salt of 2-[1-(1-piperidino)cyclohexyl]-5-methyl furan.

11. 2-[1-(1-piperidino)cyclohexyl]-5-methyl furan hydrochloride.

12. Process for producing an acid addition salt of a compound of formula,

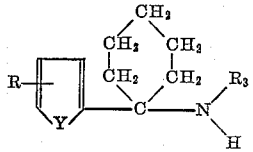

which comprises reacting a compound of formula,

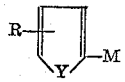

with a N-cyclohexylidene amine of formula,

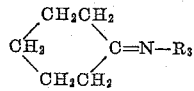

under anhydrous conditions, decomposing the resulting product with water and thereafter reacting the free base so obtained with an acid; where R is a member of the class consisting of hydrogen and methyl groups, Y is a member of the class consisting of —O— and —S—, $R_3$ is a lower alkyl group and M is an alkali metal.

No references cited.